US012594988B2

(12) United States Patent
Blom et al.

(10) Patent No.: US 12,594,988 B2
(45) Date of Patent: Apr. 7, 2026

(54) METHOD OF BRAKING AUTOMATED GUIDED VEHICLE, AND AUTOMATED GUIDED VEHICLE

(71) Applicant: ABB Schweiz AG, Baden (CH)

(72) Inventors: Jonatan Blom, Sundbyberg (SE); Jonas Larsson, Västerås (SE)

(73) Assignee: ABB Schweiz AG, Baden (CH)

( * ) Notice: Subject to any disclaimer, the term of this patent is extended or adjusted under 35 U.S.C. 154(b) by 337 days.

(21) Appl. No.: 17/596,910

(22) PCT Filed: Jun. 26, 2019

(86) PCT No.: PCT/EP2019/067055
§ 371 (c)(1),
(2) Date: Dec. 21, 2021

(87) PCT Pub. No.: WO2020/259830
PCT Pub. Date: Dec. 30, 2020

(65) Prior Publication Data
US 2022/0306193 A1     Sep. 29, 2022

(51) Int. Cl.
B62D 7/15 (2006.01)
B62D 9/00 (2006.01)

(52) U.S. Cl.
CPC ........... B62D 7/1509 (2013.01); B62D 9/007 (2013.01)

(58) Field of Classification Search
CPC ........ B62D 7/1509; B62D 9/007; B66F 7/243
See application file for complete search history.

(56) References Cited

U.S. PATENT DOCUMENTS 4,740,778 A     4/1988   Harding et al.
9,043,071 B1 *  5/2015   Lombrozo ............. B62D 9/007
                                                701/72

(Continued)

FOREIGN PATENT DOCUMENTS

DE      102009058213 A1    6/2011
EP         213938 A2       3/1987

(Continued)

OTHER PUBLICATIONS

Daisuke, Matsuoka, Translation of JP-2014240205-A (Year: 2014).*

(Continued)

*Primary Examiner* — Faris S Almatrahi
*Assistant Examiner* — Selena M Jin
(74) *Attorney, Agent, or Firm* — Whitmyer IP Group LLC

(57)     ABSTRACT

A method of braking an AGV, the AGV including a support structure and at least three drive units connected to the support structure, wherein each drive unit includes a wheel rotatable about a wheel axis and about a steering axis perpendicular to the wheel axis; an electric wheel motor arranged to drive the wheel about the wheel axis; a wheel sensor device arranged to determine a rotational position of the wheel about the wheel axis; an electric steering motor arranged to drive the wheel about the steering axis; and a steering sensor device arranged to determine a rotational position of the wheel about the steering axis; wherein the method includes positioning the wheels of the drive units in an invalid configuration; and position controlling each wheel about the respective steering axis in the invalid configuration.

17 Claims, 4 Drawing Sheets

(56) References Cited

U.S. PATENT DOCUMENTS

| | | | | |
|---|---|---|---|---|
| 2001/0032748 | A1* | 10/2001 | Demerly | B62D 11/183 |
| | | | | 180/402 |
| 2002/0167218 | A1* | 11/2002 | Chubb | B60T 1/14 |
| | | | | 303/5 |
| 2008/0162009 | A1 | 7/2008 | Miki et al. | |
| 2008/0290622 | A1 | 11/2008 | Okada | |
| 2009/0093931 | A1* | 4/2009 | Mizutani | B60K 7/0007 |
| | | | | 701/41 |
| 2010/0263961 | A1* | 10/2010 | Horiuchi | B62D 6/001 |
| | | | | 180/445 |
| 2014/0244142 | A1* | 8/2014 | Matsubara | B60W 30/08 |
| | | | | 701/116 |
| 2016/0129936 | A1* | 5/2016 | Dawson | B62D 6/007 |
| | | | | 701/41 |
| 2018/0065608 | A1* | 3/2018 | Persson | B60T 13/04 |
| 2020/0361432 | A1* | 11/2020 | Hawley | B60T 8/32 |
| 2021/0016830 | A1* | 1/2021 | Riese | B62D 6/008 |

FOREIGN PATENT DOCUMENTS

| | | | | | |
|---|---|---|---|---|---|
| EP | 0595302 | A1 | | 5/1994 | |
| JP | 2011036062 | A | | 2/2011 | |
| JP | 2014240205 | A | * | 12/2014 | B60K 17/356 |
| JP | 2017017829 | A | * | 1/2017 | |
| WO | 2006038309 | A1 | | 4/2006 | |
| WO | 2017214686 | A1 | | 12/2017 | |

OTHER PUBLICATIONS

Translation of JP-2017017829-A (Year: 2017).*
International Preliminary Report on Patentability; Application No. PCT/EP2019/067055; Completed Dec. 28, 2021: 19 Pages.
Chinese First Office Action and Search Resport; Application No. 2019800976382; Completed: Feb. 27, 2023; 15 Pages.

* cited by examiner

METHOD OF BRAKING AUTOMATED GUIDED VEHICLE, AND AUTOMATED GUIDED VEHICLE

TECHNICAL FIELD

The present disclosure generally relates to automated guided vehicles. In particular, methods of braking an automated guided vehicle and an automated guided vehicle, are provided.

BACKGROUND

Automated guided vehicles (AGVs) are typically self-powered, self-driven vehicles used to transport materials and other items from one location to another, without the need for a driver on the vehicle. AGVs are commonly used in manufacturing sites, warehouses, post offices, libraries, port terminals, airports, or some hazardous locations and specialty industries.

DE 102009058213 A1 discloses a drive unit for driving a transportation platform of a forklift. The drive unit has a chassis guidably supported in a transportation platform around a steering axis by a drive retainer. Two drive wheels are rotatably supported in the chassis and supplied with different drive torques independent of each other by motors for guiding the platform. The wheels are provided with separate mechanical drive trains. The motors are designed as direct drive and/or hub motors. A locking device blocks pivoting of the chassis around the steering axis. A rotation angle sensor detects pivoting angle of the chassis around the steering axis.

In order to hold an AGV at standstill in a parking position, the AGV may be braked by means of velocity control of a wheel motor of each wheel based on zero velocity. If all wheels are held in velocity control in this way, the AGV can be moved on the ground, e.g. by a firm push. This may be disadvantageous for various reasons, for example if the AGV carries an industrial robot and assists in carrying out a work function of the robot. Thus, in many applications, the AGV needs to keep its position at standstill.

On the other hand, if the AGV is braked by means of position control of all wheel motors, the wheel motors may hunt each other. Hunting is a phenomenon where a motor oscillates about its equilibrium or steady state. Hunting increases power consumption of the wheel motors, which is particularly undesirable for battery-powered AGVs.

Furthermore, the AGV may be braked by means of mechanical brakes at steering motors and/or wheel motors. However, direct drive steering motors and direct drive wheel motors for an AGV have low internal friction and no gearbox. Such motors can therefore easily be rotated when turned off. When no gearbox is used, a mechanical brake for braking a steering motor or a wheel motor needs to be relatively large (and consequently more expensive) since a braking torque from the brake cannot be amplified through a gearbox.

SUMMARY

One object of the present disclosure is to provide a method of braking an automated guided vehicle (AGV), which method enables an efficient braking.

A further object of the present disclosure is to provide a method of braking an AGV, which method enables elimination of mechanical brakes.

A still further object of the present disclosure is to provide a method of braking an AGV, which method enables an energy efficient braking, e.g. with a low power consumption.

A still further object of the present disclosure is to provide a method of braking an AGV, which method provides strong braking forces.

A still further object of the present disclosure is to provide a method of braking an AGV, which method enables a stabile braking of the AGV.

A still further object of the present disclosure is to provide a method of braking an AGV, which method enables a simple and/or cost-effective design of the AGV.

A still further object of the present disclosure is to provide a method of braking an AGV, which method enables a safe and reliable emergency braking of a moving AGV during power loss.

A still further object of the present disclosure is to provide a method of braking an AGV, which method solves several or all of the foregoing objects in combination.

A still further object of the present disclosure is to provide an AGV, which AGV solves one, several or all of the foregoing objects.

According to one aspect, there is provided a method of braking an AGV, the AGV comprising a support structure and at least three drive units connected to the support structure, wherein each drive unit comprises a wheel rotatable about a wheel axis and about a steering axis perpendicular to the wheel axis; an electric wheel motor arranged to drive the wheel about the wheel axis; a wheel sensor device arranged to determine a rotational position of the wheel about the wheel axis; an electric steering motor arranged to drive the wheel about the steering axis; and a steering sensor device arranged to determine a rotational position of the wheel about the steering axis; wherein the method comprises positioning the wheels of the drive units in an invalid configuration; and position controlling each wheel about the respective steering axis in the invalid configuration.

The method of this aspect is a method of braking the AGV at standstill, i.e. of holding the AGV in a parking position or stopping position. When the wheels are positioned in an invalid configuration, the AGV cannot easily move. Invalid configurations of the wheels include all positionings of the wheels except valid configurations. Valid configurations of the wheels include only orientation of all the wheels in parallel and orientation of all the wheel axes to intersect at an instant center of rotation (ICR).

By positioning the wheels in an invalid configuration and position controlling each wheel about the steering axis, forces between the wheels can be reduced while enabling the AGV to be held stably in a rest position. The reduction of forces between the wheels in turn reduces power consumption of the AGV. The power consumption of the steering motors for position controlling each wheel about the steering axis is relatively low.

The position control of each wheel about the steering axis may be carried out by position controlling the steering motor of each wheel. Each steering motor may thus be controlled to hold a target position of the wheel about the steering axis. The steering motor of each wheel may for example control the position of the associated wheel by means of proportional-integral-derivative (PID) control. Thus, the AGV is held in position by an active control of the steering motors. The control is highly responsive.

The steering motor and/or the wheel motor may be a hub motor. Alternatively, or in addition, each drive unit may comprise a driven steering member rotatable about the steering axis. The wheel motor may be connected to the driven steering member. The steering motor may be arranged to directly drive the driven steering member and/or the wheel motor may be arranged to directly drive the wheel.

The wheels may be positioned symmetrically in the invalid configuration. Alternatively, or in addition, a wheel line of each wheel may intersect a common intersection point in the invalid configuration. Throughout the present disclosure, a wheel line of a wheel is perpendicular to the steering axis and the wheel axis. The wheel line may be coincident with a heading direction the wheel.

The intersection point may be positioned within an exterior profile of the support structure. For example, in case the support structure comprises a frame, the intersection point may be positioned within the frame, as seen from above.

Alternatively, or in addition, the intersection point may be centered with respect to the support structure. This positioning of the wheels counteracts external torques on the AGV with maximum force. Furthermore, this positioning of the wheels counteracts any external force on the AGV with symmetric counterforces. An intersection point centered with respect to the support structure may be coincident, vertically above, or vertically below, a geometric center point of the support structure.

The AGV may comprise four drive units, and wherein the wheels are positioned in an X-shape in the invalid configuration. Thus, two wheels may be oriented along a first line, and two wheels may be oriented on a second line, angled with respect to the first line.

The wheel motor of one, several or all drive units may be turned off in the invalid configuration. Since the power consumption of the steering motors for position controlling each wheel about the steering axis is relatively low, the power consumption of the AGV when braking according to this variant can be very low if the wheel motors of all drive units are turned off.

Two wheels may be positioned on two non-coincident wheel lines in the invalid configuration, and each of the two wheels may be position controlled about the respective wheel axis in the invalid configuration. In other words, the two wheels are controlled to hold their position in position control. The position control of each of the two wheels on the non-coincident wheel lines about the wheel axis may be carried out by position controlling the wheel motor of each of the two wheels, such as by only controlling the wheel motor of the two wheels. The wheel motor of each of the two wheels may thus be controlled to hold a target position of the wheel about the wheel axis. The wheel motor of each of the two wheels may for example control the position of the associated wheel by means of PID control. Thus, the AGV is held in position by an active control of the steering motors and of two-wheel motors.

With two wheels positioned on two non-coincident wheel lines is meant two wheels that are not aligned on the same line. Two non-coincident wheel lines may be parallel.

Each of the remaining wheels may be velocity controlled about the respective wheel axis in the invalid configuration. Thus, except for the two wheels positioned on non-coincident wheel lines which are position controlled about their respective wheel axis, each remaining wheel may be velocity controlled about the wheel axis. The velocity control of each of the remaining wheels may comprise controlling each of the remaining wheels based on a zero velocity.

By velocity controlling the remaining wheels about the respective wheel axis in this way, forces between the wheels can be further reduced and the AGV can be held even more stably at a rest position. Furthermore, the risk of the wheel motors hunting each other is eliminated. Hunting may occur if all wheels are set in position control or if two wheels aligned on the same line are set in position control.

For example, in case the AGV comprises three drive units, a first wheel may be position controlled about the wheel axis, a second wheel (with a wheel line that is non-coincident with a wheel line of the first wheel) may be position controlled about the wheel axis, and a third wheel may be velocity controlled based on a zero velocity about the wheel axis. In case the AGV comprises four drive units, a first wheel may be position controlled about the wheel axis, a second wheel (with a wheel line that is non-coincident with a wheel line of the first wheel) may be position controlled about the wheel axis, a third wheel may be velocity controlled about the wheel axis based on a zero velocity, and a fourth wheel may be velocity controlled about the wheel axis based on a zero velocity.

According to a further aspect, there is provided a method of braking an AGV, the AGV comprising a support structure and at least three drive units connected to the support structure, wherein each drive unit comprises a wheel rotatable about a wheel axis and about a steering axis perpendicular to the wheel axis; an electric wheel motor arranged to drive the wheel about the wheel axis; a wheel sensor device arranged to determine a rotational position of the wheel about the wheel axis; an electric steering motor arranged to drive the wheel about the steering axis; and a steering sensor device arranged to determine a rotational position of the wheel about the steering axis; wherein the method comprises positioning two wheels of the drive units on two non-coincident wheel lines; position controlling each wheel of the drive units about the respective steering axis; and position controlling the two wheels about the respective wheel axis.

The method of this aspect is a method of braking the AGV at standstill, i.e. of holding the AGV in a stopping position. According to one example, two wheels on two non-coincident wheel lines are position controlled about the respective wheel axis. In this aspect, as long as two wheels are positioned on two non-coincident wheel lines, the wheels do not necessarily have to be positioned in an invalid configuration. For example, all wheels may be positioned in parallel on two or more lines. When the wheels are positioned in a valid configuration, the AGV can either rotate or travel linearly.

The two wheels on the non-coincident wheel lines are controlled to hold their position about the respective wheel axis in position control. The position control of each of the two wheels about the wheel axis may be carried out by position controlling the wheel motor of each of the two wheels, such as by only controlling the wheel motor of the two wheels. The wheel motor of each of the two wheels may thus be controlled to hold a target position of the wheel about the wheel axis. The wheel motor of each of the two wheels may for example control the position of the associated wheel by means of PID control. Thus, the AGV is held in position by an active control of the two-wheel motors.

During movement or navigation of the AGV, the wheel motors of all wheels may be velocity controlled and the steering motors of all wheels may be position controlled. When the AGV stops, the wheel motors of two wheels (on two non-coincident wheel lines) may switch to position control. By position controlling the wheel motors of two wheels at standstill of the AGV according to this aspect, the AGV cannot be moved.

The method may further comprise velocity controlling each of the remaining wheels of the drive units about the respective wheel axis. Thus, except for the two wheels positioned on non-coincident wheel lines which are position controlled about their respective wheel axis, each remaining wheel may be velocity controlled about the wheel axis. The velocity control of each of the remaining wheels may comprise controlling each of the remaining wheels based on a zero velocity.

According to a further aspect, there is provided a method of braking an AGV, the AGV comprising a support structure, and at least two drive units connected to the support structure, wherein each drive unit comprises a wheel rotatable about a wheel axis and about a steering axis perpendicular to the wheel axis; an electric wheel motor arranged to drive the wheel about the wheel axis; a wheel sensor device arranged to determine a rotational position of the wheel about the wheel axis; an electric steering motor arranged to drive the wheel about the steering axis; and a steering sensor device arranged to determine a rotational position of the wheel about the steering axis; wherein the method comprises electrically powering the wheel motors and the steering motors of the drive units by a primary power supply in a primary power mode; velocity controlling each wheel of the drive units about the respective wheel axis based on non-zero target wheel velocities; and emergency braking the AGV upon a voltage drop or a power loss in the primary power supply; wherein the emergency braking comprises braking each wheel about the respective wheel axis; electrically powering the steering motors in a secondary power mode; and controlling each wheel about the respective steering axis based on a target valid configuration of the wheels.

The method of this aspect provides a safe emergency braking of a moving AGV, e.g. to standstill, at power loss. In the method, the powering of the steering motors can be maintained. By maintaining a valid configuration of the wheels, the AGV can be safely stopped. The secondary power mode may comprise an alternative power supply, e.g. other than from the primary power supply. The method of this aspect can for example be carried out with an AGV comprising two drive units and one caster wheel.

The target valid configuration of the wheels may be determined to correspond to an instant center of rotation of the wheels requiring the smallest sum of angular adjustments of the wheels about the respective steering axis.

The secondary power mode may comprise regenerative braking of one or more-wheel motors such that electric energy generated by the respective wheel motor is transferred to the primary power supply and/or to a capacitor of the respective drive unit. The wheel motors thereby operate as generators to harvest energy from the braking. The secondary power mode may comprise electrically powering the steering motor by means of one or more capacitors. For example, a supercapacitor may be provided in each drive unit for electrically powering the steering motors. Capacitors form one example of an alternative power supply.

Alternatively, the secondary power mode may comprise regenerative braking of one or more wheel motor such that electric energy generated by the one or more wheel motor is transferred to the primary power supply when a voltage in the primary power supply decreases below a first threshold value; and shorting poles of one or more wheel motors when a voltage in the primary power supply increases above a second threshold value, higher than or equal to the first threshold value. When the voltage is below the first threshold value, or when the voltage has increased from below the first threshold value to between the first threshold value and the second threshold value, the steering motors can be powered by means of the regenerative braking of the wheel motors. When the voltage is above the second threshold value, or when the voltage has decreased from above the second threshold value to between the second threshold value and the first threshold value, the steering motors can be powered by means of the primary power supply.

Throughout the present disclosure, the wheel motor of each drive unit may be arranged to directly drive the wheel about the respective wheel axis, and/or the steering motor of each drive unit may be arranged to directly drive the wheel about the respective steering axis. The wheel motor may be an outrunner. The steering motor may be an inrunner or an outrunner.

According to a further aspect, there is provided an AGV configured to carry out any of the methods according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
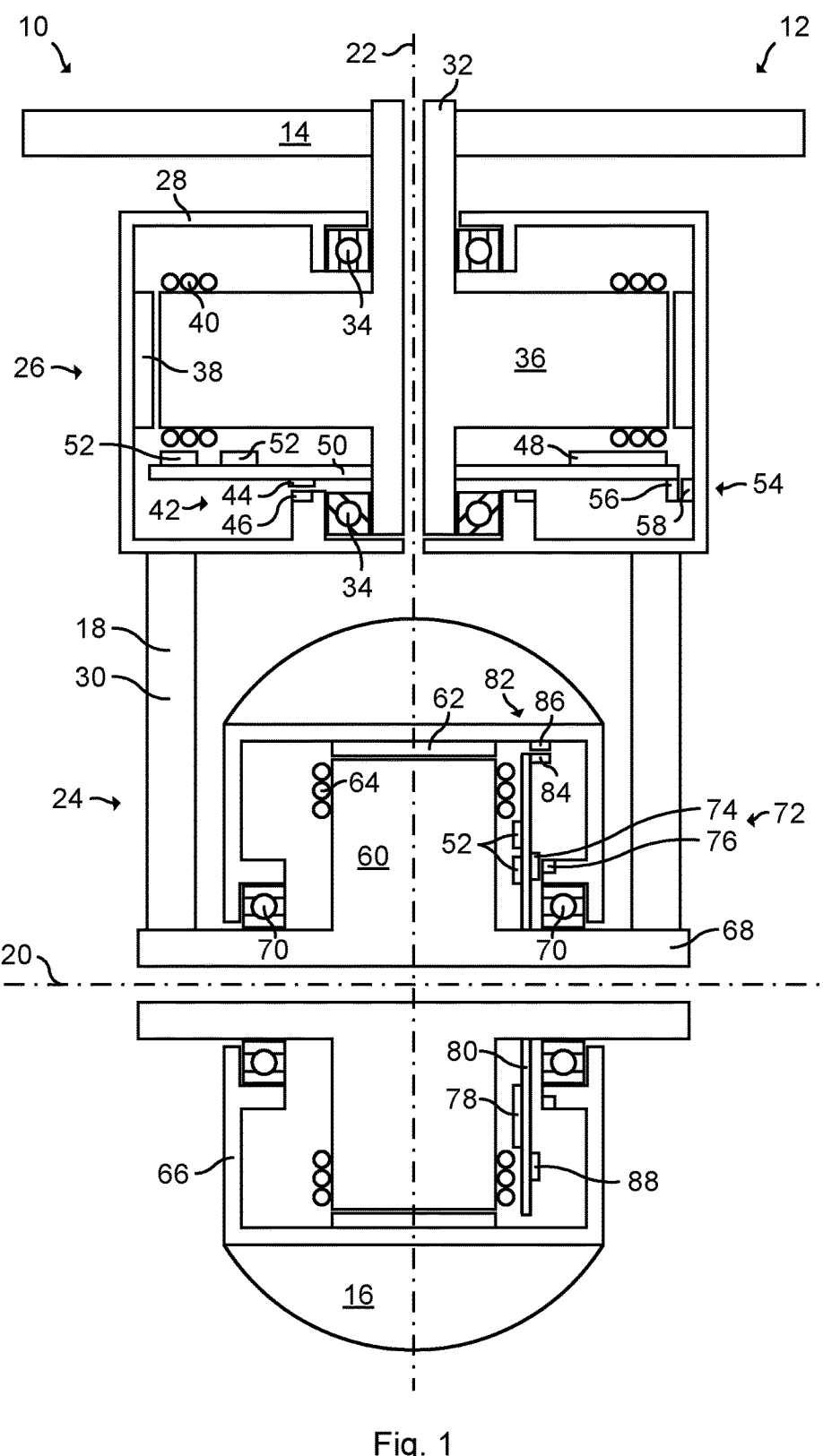
FIG. 1: schematically represents a cross-sectional view of a drive unit for an AGV.

In the following, methods of braking an automated guided vehicle and an automated guided vehicle, will be described. The same or similar reference numerals will be used to denote the same or similar structural features.

FIG. 1 schematically represents a cross-sectional view of one example of a drive unit 10 for an automated guided vehicle (AGV) 12. The AGV 12 is only partially illustrated in FIG. 1. The AGV 12 comprises a support structure 14 (only partly illustrated) and a plurality of drive units 10 (only one is shown in FIG. 1) connected to the support structure 14.

The drive unit 10 comprises a wheel 16 and a driven steering member 18. The wheel 16 is rotatable about a wheel axis 20. The driven steering member 18 and the wheel 16 are rotatable about a steering axis 22. The wheel axis 20 is perpendicular to the steering axis 22. Moreover, the wheel axis 20 intersects the steering axis 22. In FIG. 1, the wheel axis 20 is horizontal and the steering axis 22 is vertical. The wheel axis 20 provides a first degree of freedom for the drive unit 10. The steering axis 22 provides a second degree of freedom for the drive unit 10.

The drive unit 10 further comprises an electric synchronous wheel motor 24. The wheel motor 24 is arranged to rotationally drive the wheel 16 about the wheel axis 20. In this example, the wheel motor 24 is arranged to directly drive the wheel 16, i.e. without any intermediate gearing between the wheel motor 24 and the wheel 16.

The drive unit 10 further comprises an electric synchronous steering motor 26. The steering motor 26 is arranged to rotationally drive the driven steering member 18 about the steering axis 22. The steering motor 26 and the wheel motor 24 may for example each provide a torque of at least 5 Nm.

The steering motor 26 is arranged to directly drive the driven steering member 18, i.e. without any intermediate gearing between the steering motor 26 and the driven steering member 18. The driven steering member 18 of the example in FIG. 1 comprises a base part 28 and two arm parts 30 extending downwards from the base part 28.

The drive unit 10 further comprises a steering shaft 32 and two steering bearings 34 for rotationally supporting the driven steering member 18 about the steering axis 22. The steering shaft 32 is rigidly connected to the support structure 14 of the AGV 12. The steering motor 26 comprises a steering stator 36, a steering rotor 38 and steering coils 40. The steering rotor 38 is arranged inside the base part 28. The steering coils 40 are arranged on the steering stator 36. In this example, the base part 28 is an integral part of the steering rotor 38.

The drive unit 10 further comprises a steering sensor device 42. The steering sensor device 42 determines a rotational position of the driven steering member 18, and consequently also of the wheel 16, about the steering axis 22. The steering sensor device 42 comprises an active part, here constituted by a Hall effect steering sensor 44, and a passive part, here constituted by a multipole steering encoder ring 46. The steering encoder ring 46 may for example comprise 128 poles. The steering sensor device 42 thereby constitutes a relatively cheap high-resolution encoder for accurate determination of a rotational position of the steering rotor 38, the driven steering member 18 and the wheel 16 about the steering axis 22.

The drive unit 10 further comprises steering drive electronics 48. The steering drive electronics 48 controls the operation of the steering motor 26, for example by means of PWM control. The drive unit 10 further comprises a steering circuit board 50. The Hall effect steering sensor 44 and the steering drive electronics 48 are provided on the steering circuit board 50. The steering encoder ring 46 is connected to the driven steering member 18. The drive unit 10 further comprises capacitors 52 arranged on the steering circuit board 50.

The drive unit 10 further comprises a steering homing switch 54 for homing the steering motor 26. The steering homing switch 54 comprises a steering homing sensor 56 and a steering homing magnet 58. The steering homing sensor 56 is provided on the steering circuit board 50. The steering homing magnet 58 is provided on the base part 28.

The wheel motor 24 comprises a wheel stator 60, a wheel rotor 62 and wheel coils 64. The wheel stator 60 is arranged inside the wheel 16. The wheel coils 64 are arranged on the wheel stator 60. The wheel 16 comprises a hub 66. The hub 66 is an integral part of the wheel rotor 62. The drive unit 10 further comprises a wheel shaft 68 and two-wheel bearings 70 for rotationally supporting the wheel 16 about the wheel axis 20. The wheel shaft 68 is rigidly connected to the arm parts 30 of the driven steering member 18.

The drive unit 10 further comprises a wheel sensor device 72. The wheel sensor device 72 may be of the same type as the steering sensor device 42. The wheel sensor device 72 determines a rotational position of the wheel 16 about the wheel axis 20. The wheel sensor device 72 comprises an active part, here constituted by a Hall effect wheel sensor 74, and a passive part, here constituted by a multipole wheel encoder ring 76. The wheel encoder ring 76 may for example comprise 128 poles. The wheel sensor device 72 thereby constitutes a relatively cheap high-resolution encoder for accurate determination of a rotational position of the wheel rotor 62 and the wheel 16 about the wheel axis 20.

The drive unit 10 further comprises wheel drive electronics 78. The wheel drive electronics 78 controls the operation of the wheel motor 24, for example by means of PWM control. The drive unit 10 further comprises a wheel circuit board 80. The Hall effect wheel sensor 74 and the wheel drive electronics 78 are provided on the wheel circuit board 80. The wheel encoder ring 76 is connected to the hub 66. The drive unit 10 further comprises capacitors 52 arranged on the wheel circuit board 80.

The drive unit 10 further comprises a wheel homing switch 82 for homing the wheel motor 24. The wheel homing switch 82 comprises a wheel homing sensor 84 and a wheel homing magnet 86. The wheel homing sensor 84 is provided on the wheel circuit board 80. The wheel homing magnet 86 is provided on the hub 66.

The drive unit 10 further comprises an accelerometer 88. The accelerometer 88 determines acceleration of the wheel 16. The accelerometer 88 may for example be a low cost micromachined microelectromechanical systems (MEMS) accelerometer. In this example, the accelerometer 88 is provided on the wheel circuit board 80. The accelerometer 88 may however be positioned elsewhere in the drive unit 10.

Figure 2:
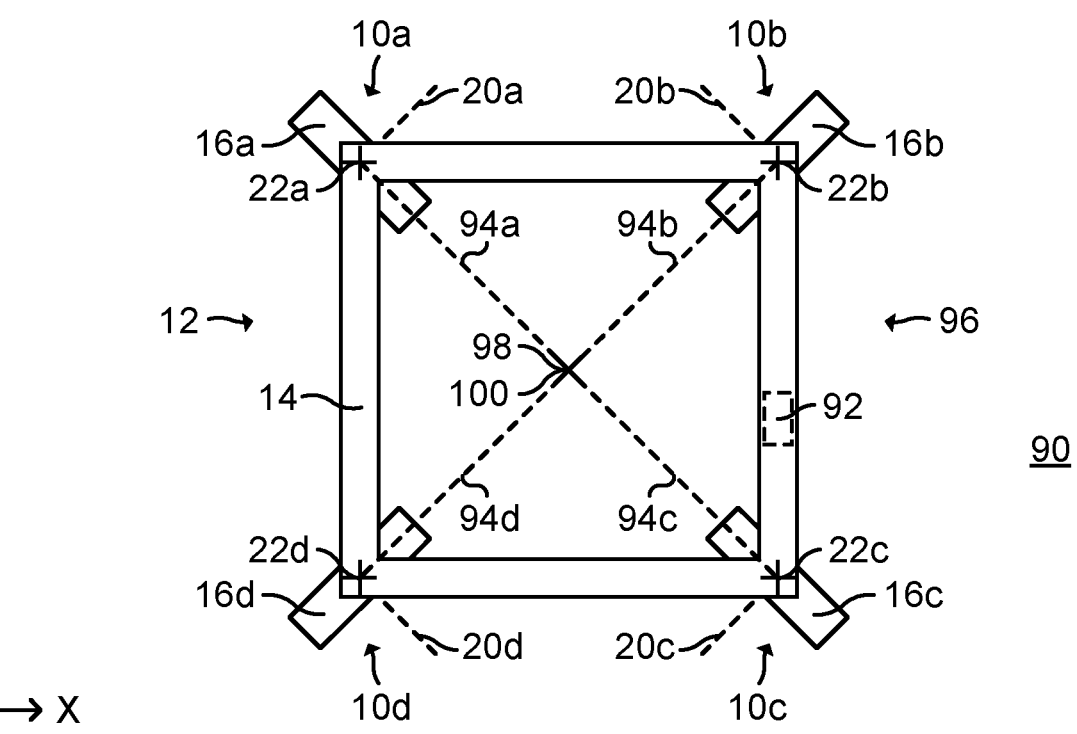
FIG. 2: schematically represents a top view of one example of braking the AGV.

FIG. 2 schematically represents a top view of one example of braking the AGV 12. The AGV 12 comprises four drive units 10a-10d and consequently four wheels 16a-16d. Each drive unit 10a-10d is of the type illustrated in FIG. 1. The AGV 12 may however comprise fewer than four drive units 10 or more than four drive units 10.

In FIG. 2, each drive unit 10a-10d is connected to a corner of the support structure 14. The support structure 14 is here exemplified as a frame. The drive units 10a-10d are placed in a square.

The wheels 16a-16d are traction wheels for driving the AGV 12 on a surface, such as a horizontal floor 90. FIG. 1 further shows a Cartesian coordinate system X, Y, Z for reference purposes. The floor 90 is arranged in the XY-plane.

The AGV 12 further comprises a central control system (not shown). The central control system is provided in the support structure 14. The central control system is in signal communication with each drive unit 10a-10d via controller area network (CAN) buses (not shown). The AGV 12 further comprises a primary power supply 92, such as a battery, for powering each drive unit 10a-10d via a direct current (DC) bus (not shown). Further capacitors may also be provided on the DC bus.

Each drive unit 10a-10d in FIG. 2 is of the same type as in FIG. 1. The AGV 12 in FIG. 2 does not comprise any mechanical brake.

FIG. 2 shows a wheel line 94a-94d of each wheel 16a-16d. The first wheel line 94a is perpendicular to the first wheel axis 20a and to the first steering axis 22a. The second wheel line 94b is perpendicular to the second wheel axis 20b and to the second steering axis 22b. The third wheel line 94c is perpendicular to the third wheel axis 20c and to the third steering axis 22c. The fourth wheel line 94d is perpendicular to the fourth wheel axis 20d and to the fourth steering axis 22d.

The wheels 16a-16d are positioned in an invalid configuration 96. In this example, the wheels 16a-16d are positioned in an X-shape. The first wheel line 94a is coincident with the third wheel line 94c. The second wheel line 94b is coincident with the fourth wheel line 94d. The wheels 16a-16d are positioned symmetrically in the invalid configuration 96.

In this example, each wheel line 94a-94d intersects a common intersection point 98. The intersection point 98 is positioned within an exterior profile of the support structure 14, i.e. inside the frame. In this example, the intersection point 98 centered with respect to the support structure 14, i.e. aligned with a geometric center point 100 of the support structure 14.

In FIG. 2, the steering motor 26 of each wheel 16a-16d position controls the wheel 16a-16d about the respective steering axis 22a-22d. Furthermore, the wheel motor 24 of each wheel 16a-16d is turned off. The AGV 12 is thereby stably held at standstill with low power consumption. With the positioning of the wheels 16a-16d in the invalid configuration 96 according to FIG. 2, practically no horizontal forces acting on the support structure 14 will be transferred to the steering motors 26 of the drive units 10a-10d.

Figure 3:
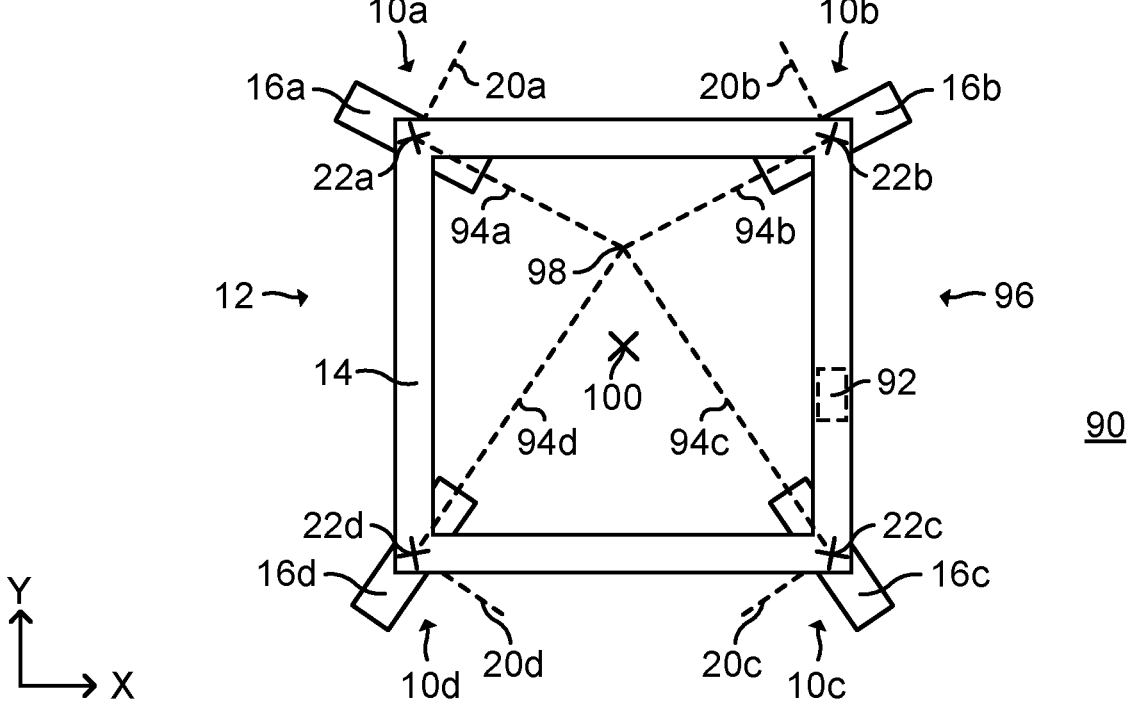
FIG. 3: schematically represents a top view of a further example of braking the AGV.

FIG. 3 schematically represents a top view of a further example of braking the AGV 12. The AGV 12 is of the same type as in FIG. 2. The wheels 16a-16d are positioned in an invalid configuration 96. The wheels 16a-16d are positioned symmetrically in the invalid configuration 96.

Also in this example, each wheel line 94a-94d intersects a common intersection point 98 within the exterior profile of the support structure 14. However, the intersection point 98 is offset with respect to the geometric center point 100 of the support structure 14.

In FIG. 3, the steering motor 26 of each wheel 16a-16d position controls the wheel 16a-16d about the respective steering axis 22a-22d. Furthermore, the wheel motor 24 of each wheel 16a-16d is turned off. The AGV 12 is thereby stably held at standstill with low power consumption.

Figure 4:
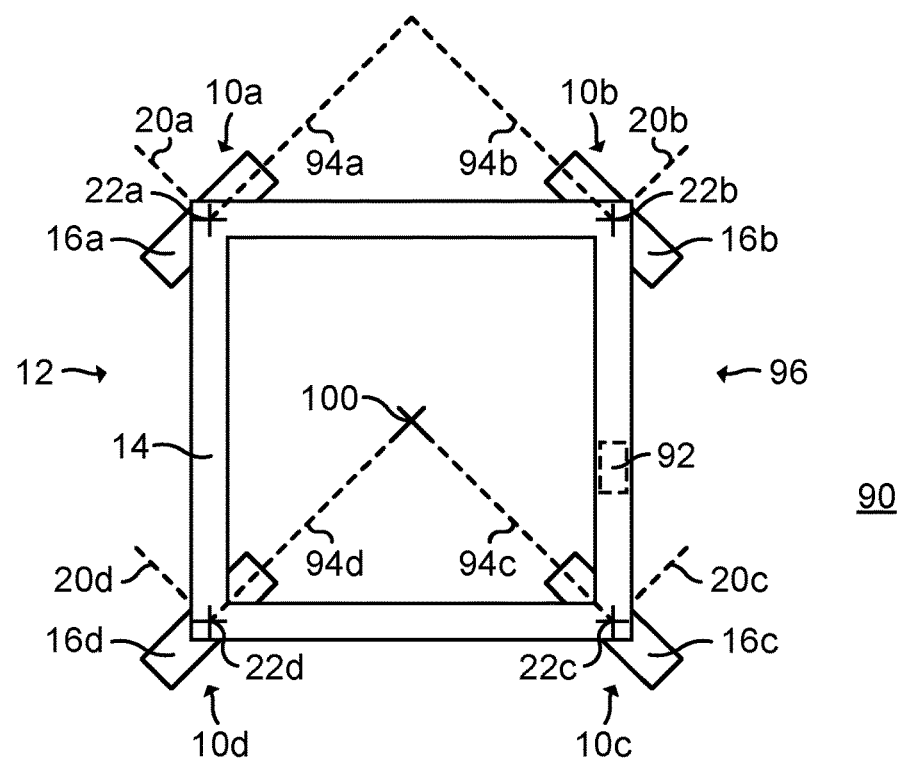
FIG. 4: schematically represents a top view of a further example of braking the AGV.

FIG. 4 schematically represents a top view of a further example of braking the AGV 12. The AGV 12 is of the same type as in FIG. 2. The wheels 16a-16d are positioned in an invalid configuration 96. The wheels 16a-16d are positioned symmetrically in the invalid configuration 96.

In this example, the first wheel line 94a and the second wheel line 94b intersect outside the support structure 14. The third wheel line 94c and the fourth wheel line 94d intersect at the geometric center point 100 of the support structure 14.

In FIG. 4, the steering motor 26 of each wheel 16a-16d position controls the wheel 16a-16d about the respective steering axis 22a-22d. Furthermore, the wheel motor 24 of each wheel 16a-16d is turned off. The AGV 12 is thereby stably held at standstill with low power consumption.

Figure 5:
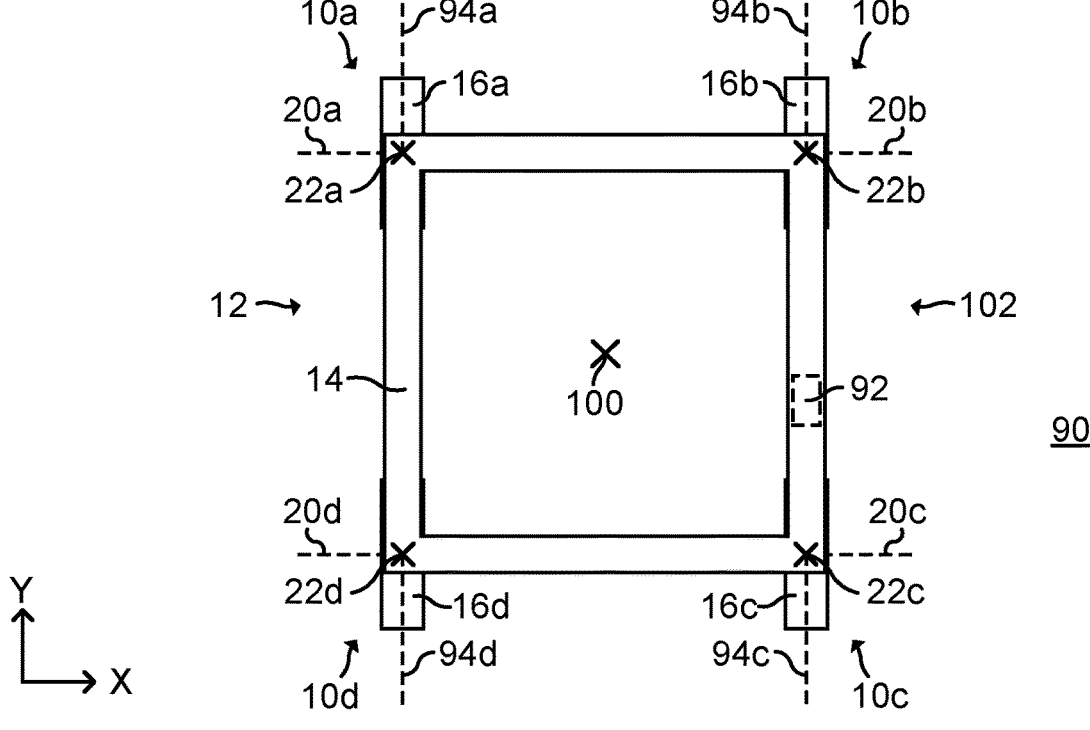
FIG. 5: schematically represents a top view of a further example of braking the AGV.

FIG. 5 schematically represents a top view of a further example of braking the AGV 12. The AGV 12 is of the same type as in FIG. 2.

In FIG. 5, the wheels 16a-16d of the AGV 12 are positioned in a valid configuration 102. The first wheel line 94a is coincident with the fourth wheel line 94d and the second wheel line 94b is coincident with the third wheel line 94c. The first wheel 16a and the fourth wheel 16d are positioned on a common first line and the second wheel 16b and the third wheel 16c are positioned on a common second line, parallel with and offset from the first line. The first wheel 16a and the second wheel 16b are thus positioned on two non-coincident wheel lines 94a and 94b.

In FIG. 5, the steering motor 26 of each wheel 16a-16d position controls the wheel 16a-16d about the respective steering axis 22a-22d. Furthermore, the wheel motor 24 of the first wheel 16a position controls the first wheel 16a about the first wheel axis 20a and the wheel motor 24 of the second wheel 16b position controls the second wheel 16b about the second wheel axis 20b. The wheel motor 24 of the third wheel 16c velocity controls the third wheel 16c about the third wheel axis 20c based on a zero-velocity reference and the wheel motor 24 of the fourth wheel 16d velocity controls the fourth wheel 16d about the fourth wheel axis 20d based on a zero velocity reference. The AGV 12 is thereby stably held at standstill with low power consumption.

Figure 6:
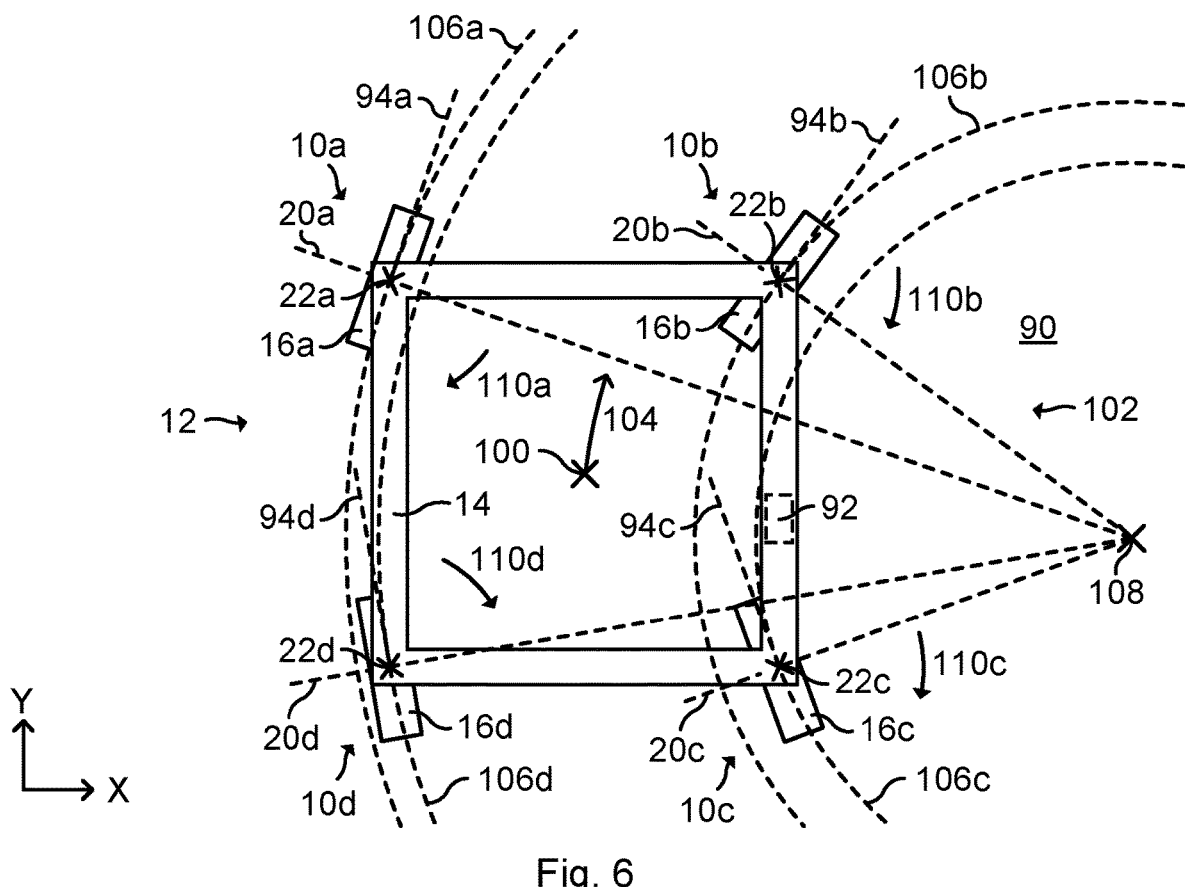
FIG. 6: schematically represents a top view of a further example of braking the AGV.

FIG. 6 schematically represents a top view of a further example of braking the AGV 12. The AGV 12 is of the same type as in FIG. 2.

In FIG. 6, the AGV 12 travels along a curved path. Arrow 104 indicates the current heading of the AGV 12. The first wheel 16a follows a first path 106a, the second wheel 16b follows a second path 106b, the third wheel 16c follows a third path 106c, and the fourth wheel 16d follows a fourth path 106d.

The wheel axes 20a-20d of the wheels 16a-16d intersect at an instant center of rotation (ICR) 108. Thus, each path 106a-106d is circular and centered on the ICR 108.

During the motion of the AGV 12 in FIG. 6, the first wheel 16a is driven by the associated steering motor 26 to rotate about the first steering axis 22a as indicated with arrow 110a, the second wheel 16b is driven by the associated steering motor 26 to rotate about the second steering axis 22b as indicated with arrow 110b, the third wheel 16c is driven by the associated steering motor 26 to rotate about the third steering axis 22c as indicated with arrow 110c, and the fourth wheel 16d is driven by the associated steering motor 26 to rotate about the fourth steering axis 22d as indicated with arrow 110d.

During normal operation of the AGV 12, electric braking can be achieved by applying a negative torque to one or more wheels 16a-16d by means of the associated wheel motor 24. During braking of the AGV 12, each wheel motor 24 will generate a current that is fed back to the primary power supply 92 when the requested braking torque is below a certain speed dependent torque. If a higher braking torque is requested, the braking will consume current from the primary power supply 92. During normal operation of the AGV 12, the steering motor 26 and the wheel motor 24 of each wheel 16a-16d are controlled by the primary power supply 92 in a primary power mode.

In the following, a method of emergency braking the AGV 12 during power loss will be described. A power loss may occur for various reasons, for example if a cable is damaged or a fuse is blown.

When the steering drive electronics 48 or the wheel drive electronics 78 of any drive unit 10a-10d detects that the main voltage is dropping, it immediately turns off the associated steering motor 26 or wheel motor 24. The steering drive electronics 48 or the wheel drive electronics 78 sends a message on the CAN to the other steering drive electronics 48 and the other wheel drive electronics 78 that an emergency stop of the AGV 12 is required. Most likely, also the other steering drive electronics 48 and the other wheel drive electronics 78 will have detected a voltage drop.

The capacitors 52 on the steering drive electronics 48 and on the wheel drive electronics 78 will maintain a voltage high enough to keep the steering drive electronics 48 and the wheel drive electronics 78 functional during initialization of the emergency braking, e.g. during a few milliseconds.

During the emergency braking of the AGV 12, the wheels 16a-16d need to be maintained in the valid configuration 102 so that the wheels 16a-16d can continue to rotate and so that the AGV 12 can maintain its heading 104 during braking. Otherwise, undesired behavior of the AGV 12 may occur, for example tipping of the AGV 12 when carrying an upright load.

The maintenance of the valid configuration 102 of the AGV 12 is particularly important when direct drive steering motors 26 are used since these steering motors 26 have very low internal friction and can easily lose its angle when not actively controlled.

When the emergency braking process has been initiated, the wheel drive electronics 78 of each drive unit 10a-10d starts to control a maximum regenerative braking torque on the associated wheel motor 24 until the bus voltage exceeds a second threshold value. During the regenerative braking, the steering motors 26 are powered in a secondary power mode. When the bus voltage reaches the second threshold value, the wheel drive electronics 78 of each drive unit 10a-10d shorts the poles of the associated wheel motor 24 to dump braking energy into the windings of the wheel motor 24. Thereby, the braking torque is increased. All poles may for example be connected to electrical ground or to a positive supply. Thereby, a braking torque equal to the stall torque of the wheel motor 24 will be created for each drive unit 10a-10d. The braking energy will then be converted to heat in the windings. The poles of the wheel motors 24 may be shorted passively, for example by means of a 3-channel relay that is closed as default upon power loss.

The regenerative braking is resumed when the bus voltage drops below a first threshold value, lower than the second threshold value. In this way, electric powering of all steering motors 26 can be ensured during the emergency braking.

The difference between the first threshold value and the second threshold value may be a predefined hysteresis value. The second threshold value may for example be 24 V and the first threshold value may be 20 V.

Regardless of whether the steering motors 26 are powered by means of regenerative braking of the wheel motors 24, or by the primary power supply 92, the steering motors 26 are controlled to agree on an ICR 108. When the power loss in the AGV 12 occurs, it is possible that one or more steering motors 26 will have a non-zero angular speed. In FIG. 6, each wheel 16a-16d has a non-zero angular speed about the respective steering axis 22a-22d, as indicated with arrows 110a-110d.

Until the angular speed of all steering motors 26 are below a predefined value, a new ICR 108 is calculated in each timestep. In each timestep, the ICR 108 that requires the minimum sum of angular adjustments of the wheels 16a-16d about the respective steering axis 22a-22d from their current position, is calculated. Thus, the ICR 108 is iteratively corrected.

For example, the steering drive electronics 48 that detect an angular speed of the associated steering motor 26 above the predefined value may velocity control the associated steering motor 26 based on zero velocity. The steering drive electronics 48 that detect an angular speed of the associated steering motor 26 below the predefined value may position control the associated steering motor 26 based on a position derived from the latest ICR 108. In order to not drain the bus voltage too much, the steering drive electronics 48 of each drive unit 10a-10d may limit the control current in dependence on the bus voltage.

The above process continues until the speed of each wheel 16a-16d about the respective wheel axis 20a-20d is too low to generate enough current to keep the steering drive electronics 48 functional.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of braking an automated guided vehicle, the automated guided vehicle comprising a support structure and at least three drive units connected to the support structure, wherein each drive unit comprises:
   a wheel rotatable about a wheel axis and about a steering axis perpendicular to the wheel axis;
   an electric wheel motor arranged to drive the wheel about the wheel axis;
   a wheel sensor device arranged to determine a rotational position of the wheel about the wheel axis;
   an electric steering motor arranged to drive the wheel about the steering axis; and
   a steering sensor device arranged to determine a rotational position of the wheel about the steering axis;
   wherein the method comprises:
   positioning the wheels of the drive units in an invalid configuration; and
   position controlling each steering motor to hold a target position of the respective wheel about the respective steering axis while in the invalid configuration;
   wherein two of said wheels are positioned on two non-coincident wheel lines in the invalid configuration, and wherein the wheel motor of each of the two wheels is position controlled to hold a target position about the respective wheel axis in the invalid configuration;
   wherein the wheel motor of each of the remaining wheels is velocity controlled about the respective wheel axis in the invalid configuration based on a zero velocity.

2. The method according to claim 1, wherein the wheels are positioned symmetrically in the invalid configuration.

3. The method according to claim 2, wherein a wheel line of each wheel intersects a common intersection point in the invalid configuration.

4. The method according to claim 2, wherein the automated guided vehicle comprises four drive units, and wherein the wheels are positioned in an X-shape in the invalid configuration.

5. The method according to claim 2, wherein the wheel motor of one, several or all drive units is turned off in the invalid configuration.

6. The method according to claim 2, wherein two wheels are positioned on two non-coincident wheel lines in the invalid configuration, and wherein each of the two wheels is position controlled about the respective wheel axis in the invalid configuration.

7. The method according to claim 1, wherein a wheel line of each wheel intersects a common intersection point in the invalid configuration.

8. The method according to claim 7, wherein the intersection point is positioned within an exterior profile of the support structure.

9. The method according to claim 8, wherein the intersection point is centered with respect to the support structure.

10. The method according to claim 7, wherein the intersection point is centered with respect to the support structure.

11. The method according to claim 1, wherein the automated guided vehicle comprises four drive units, and wherein the wheels are positioned in an X-shape in the invalid configuration.

12. The method according to claim 1, wherein the wheel motor of one, several or all drive units is turned off in the invalid configuration.

13. An automated guided vehicle comprising at least two wheels and two drive units with a braking system operating to the method according to claim 1.

14. A method of braking an automated guided vehicle, the automated guided vehicle comprising a support structure and at least three drive units connected to the support structure, wherein each drive unit comprises:

a wheel rotatable about a wheel axis and about a steering axis perpendicular to the wheel axis;

an electric wheel motor arranged to drive the wheel about the wheel axis;

a wheel sensor device arranged to determine a first rotational position of the wheel about the wheel axis;

an electric steering motor arranged to drive the wheel about the steering axis; and a steering sensor device arranged to determine a second rotational position of the wheel about the steering axis;

wherein the method comprises:

positioning two wheels of the drive units on two non-coincident wheel lines;

position controlling each wheel of the drive units to hold a target position about the respective steering axis;

position controlling each of the two wheels to hold a target position about the respective wheel axis; and velocity controlling each of the remaining wheels of the drive units about the respective wheel axis based on a zero velocity.

15. A method of braking an automated guided vehicle, the automated guided vehicle comprising a support structure, and at least two drive units connected to the support structure, wherein each drive unit comprises:

a wheel rotatable about a wheel axis and about a steering axis perpendicular to the wheel axis;

an electric wheel motor arranged to drive the wheel about the wheel axis;

a wheel sensor device arranged to determine a rotational position of the wheel about the wheel axis;

an electric steering motor arranged to drive the wheel about the steering axis; and a steering sensor device arranged to determine a rotational position of the wheel about the steering axis;

wherein the method comprises:

electrically powering the wheel motors and the steering motors of the drive units by a primary power supply in a primary power mode;

velocity controlling each wheel of the drive units about the respective wheel axis based on non-zero target wheel velocities; and emergency braking the automated guided vehicle upon a voltage drop or a power loss in the primary power supply, the voltage drop or the power loss being detected as an emergency;

wherein the emergency braking comprises:

braking each wheel about the respective wheel axis;

electrically powering the steering motors in a secondary power mode; and controlling each wheel about the respective steering axis based on a target valid configuration of the wheels.

16. The method according to claim 15, wherein the target valid configuration of the wheels is determined to correspond to an instant center of rotation of the wheels requiring the smallest sum of angular adjustments of the wheels about the respective steering axis.

17. The method according to claim 15, wherein the secondary power mode comprises regenerative braking of one or more-wheel motors such that electric energy generated by the respective wheel motor is transferred to the primary power supply and/or to a capacitor of the respective drive unit.

* * * * *